United States Patent
Carroll et al.

(10) Patent No.: US 12,421,446 B2
(45) Date of Patent: Sep. 23, 2025

(54) CARBON DIOXIDE SEQUESTERED PROPPANTS FOR WELL STIMULATION

(71) Applicant: Chevron U.S.A. Inc., San Ramon, CA (US)

(72) Inventors: Caleb Kimbrell Carroll, The Woodlands, TX (US); Seung Jin Han, Katy, TX (US); Said Rachid Daher, Pasadena, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/830,970

(22) Filed: Sep. 11, 2024

(65) Prior Publication Data

US 2025/0002776 A1 Jan. 2, 2025

Related U.S. Application Data (62) Division of application No. 18/065,345, filed on Dec. 13, 2022, now Pat. No. 12,110,455.

(60) Provisional application No. 63/289,136, filed on Dec. 13, 2021.

(51) Int. Cl.
*C09K 8/80* (2006.01)

(52) U.S. Cl.
CPC .................. *C09K 8/805* (2013.01)

(58) Field of Classification Search
CPC ...................................... C09K 8/805
See application file for complete search history.

(56) References Cited

U.S. PATENT DOCUMENTS

| | | | |
|---|---|---|---|
| 8,012,582 B2 | 9/2011 | Luo et al. | |
| 8,470,275 B2 | 6/2013 | Constantz et al. | |
| 8,603,424 B2 | 12/2013 | Constantz et al. | |
| 2010/0135882 A1* | 6/2010 | Constantz | C02F 1/683 |
| | | | 423/234 |
| 2014/0209386 A1* | 7/2014 | Jamison | E21B 21/00 |
| | | | 166/305.1 |
| 2017/0321113 A1* | 11/2017 | Kropf | C09K 8/805 |
| 2020/0024509 A1 | 1/2020 | Kropf | |
| 2021/0140296 A1 | 5/2021 | Nguyen | |

* cited by examiner

*Primary Examiner* — Crystal J Lee
(74) *Attorney, Agent, or Firm* — King & Spalding LLP (57) ABSTRACT

A method of making a hydraulic fracturing slurry can include contacting an aqueous solution comprising calcium ions with a carbon dioxide source producing a carbonated aqueous solution. Substrate particles can be submerged in the carbonated aqueous solution to produce a calcium carbonate coated proppant wherein the carbon dioxide is sequestered in the calcium carbonate. The calcium coated proppant can be combined with hydraulic fracturing fluid to produce a hydraulic fracturing slurry. Alternatively, the calcium carbonate coated proppant can be combined with silica sand to produce a proppant composition used in a hydraulic fracturing slurry.

19 Claims, 7 Drawing Sheets

Specific Gravity of Sand: 2.63
Specific Gravity of Calcium Carbonate: 2.71

| Uncoated Mesh Size | Uncoated Diameter (mm) | Uncoated Volume (mm^3) | 100% Coated Volume (mm^3) | 100% Coated Diameter (mm) | Coated Mesh Size |
|---|---|---|---|---|---|
| 200 mesh | 0.074 | 0.000212 | 0.0004243 | 0.093 | 140 mesh |
| 100 mesh | 0.149 | 0.001732 | 0.0034641 | 0.188 | 70 mesh |
| 70 mesh | 0.21 | 0.004849 | 0.0096981 | 0.265 | 50 mesh |
| 40 mesh | 0.42 | 0.037924 | 0.0773848 | 0.529 | 30 mesh |
| 20 mesh | 0.841 | 0.311458 | 0.6228975 | 1.060 | 16 mesh |

FIG. 7b  Unconventional Fracturing

FIG. 7a  Conventional Fracturing

US 12,421,446 B2

CARBON DIOXIDE SEQUESTERED PROPPANTS FOR WELL STIMULATION

RELATED APPLICATIONS

The present application is a divisional application of and claims priority to U.S. patent application Ser. No. 18/065,345 filed Dec. 13, 2022, which application claims priority to U.S. Provisional Patent Application No. 63/289,136, filed Dec. 13, 2021. The entire contents of the foregoing applications are incorporated herein by reference.

TECHNICAL FIELD

Embodiments of the technology relate generally to using proppants containing sequestered carbon dioxide for stimulating wells.

BACKGROUND

Wells are drilled into land and subsea formations in order to produce resources such as water and hydrocarbons (e.g. petroleum and natural gas). In some cases, hydraulic fracturing techniques are applied to formations to open or enlarge passages in the formation to facilitate the extraction of hydrocarbons. Hydraulic fracturing stimulates target formations in a given well by injecting e slurry at high pressure into the formation in order to open or enlarge passages in the formation. The slurry typically includes water in combination with other materials, and can include proppants. Proppants are natural or human-made solid materials, such as sand grains or ceramic materials, transported by the fluid and that become wedged into the passages in the formation and assist in maintaining the opening of the passage to facilitate the flow of hydrocarbons from the formation to the well. Traditionally, rigid particles, such as silica sand or high strength polymers, are used as proppant.

Separately, there have been a variety of efforts throughout various industries to reduce the amount of carbon dioxide released into the atmosphere. With respect to hydrocarbon wells, carbon dioxide is released in connection with the vehicles, machinery, and cement used in the drilling, completion, and operation of those wells. One approach to reducing the amount of carbon dioxide emitted into the atmosphere is to capture and sequester carbon dioxide released during various activities. The captured carbon dioxide can be combined with an aqueous solution to produce calcium carbonate, thereby locking up the captured carbon dioxide in the produced calcium carbonate. New applications that allow utilization of calcium carbonate containing captured carbon dioxide in place of conventional materials provide additional opportunities to reduce the amount of carbon dioxide released into the atmosphere.

SUMMARY

In one example embodiment, the present disclosure is generally directed to a method of making a proppant for a hydraulic fracturing slurry. The method comprises contacting an aqueous solution comprising calcium ions with a carbon dioxide source producing a carbonated aqueous solution; submerging substrate particles in the carbonated aqueous solution to produce calcium carbonate coated proppant comprising the substrate particles coated with calcium carbonate; and blending the calcium carbonate coated proppant with a hydraulic fracturing fluid to produce the hydraulic fracturing slurry.

The foregoing method can further include one or more of the following aspects. The carbon dioxide source can be at least one of air and flue gas. The foregoing method can further comprise, after contacting the aqueous solution with the carbon dioxide source, releasing a depleted carbon dioxide gas. The foregoing method can further comprise applying a protective coating over the calcium carbonate coated proppant.

In the foregoing method, the substrate particles can be one of silica sand, drilling cuttings from well drilling, recycled cement, or fly ash. The substrate particles can have a mesh size range between 20 mesh and 200 mesh and the calcium carbonate coated proppant can have a mesh size range between 16 mesh and 140 mesh.

In another example embodiment, the present disclosure is directed to a method of making a proppant for a hydraulic fracturing slurry. The method comprises contacting an aqueous solution comprising calcium ions with a carbon dioxide source producing a carbonated aqueous solution; causing calcium carbonate particles to precipitate from the carbonated aqueous solution producing calcium carbonate proppant; and blending the calcium carbonate proppant with a hydraulic fracturing fluid to produce the hydraulic fracturing slurry.

The foregoing method can further include one or more of the following aspects. The carbon dioxide source can be at least one of air and flue gas. The foregoing method can further comprise, after contacting the aqueous solution with the carbon dioxide source, releasing a depleted carbon dioxide gas. The foregoing method can further comprise applying a protective coating over the calcium carbonate coated proppant. In the foregoing method, the calcium carbonate coated proppant can have a mesh size range between 16 mesh and 140 mesh.

In another example embodiment, the present disclosure is directed to a hydraulic fracturing slurry. The hydraulic fracturing slurry comprises hydraulic fracturing fluid and a proppant composition comprising 50% or more by weight of silica sand particles and up to 50% by weight of sequestered carbon dioxide particles.

The foregoing hydraulic fracturing slurry can further include one or more of the following aspects. The sequestered carbon dioxide particles can comprise a substrate particle coated with calcium carbonate and then can further comprise a protective coating.

In the foregoing hydraulic fracturing slurry, the substrate particles can be one of silica sand, drilling cuttings from well drilling, recycled cement, and fly ash. The carbon dioxide sequestered particles can have a mesh size range between 16 mesh and 200 mesh.

In the foregoing hydraulic fracturing slurry, the sequestered carbon dioxide particles can consist of calcium carbonate. Additionally, the sequestered carbon dioxide particles can include a protective coating.

In yet another example embodiment, the present disclosure is directed to a method of stimulating a well comprising injecting a hydraulic fracturing slurry into the well, the hydraulic fracturing slurry comprising: hydraulic fracturing fluid; and a proppant composition comprising 50% or more by weight of silica sand particles and up to 50% by weight of sequestered carbon dioxide particles.

The foregoing method can further include one or more of the following aspects. The sequestered carbon dioxide particle can comprise a substrate particle coated with calcium carbonate and then can further comprise a protective coating.

In the foregoing method, the substrate particles can be one of silica sand, drilling cuttings from well drilling, recycled cement, and fly ash. The carbon dioxide sequestered particles can have a mesh size range between 16 mesh and 200 mesh.

In the foregoing method, the sequestered carbon dioxide particles can consist of calcium carbonate. Additionally, the sequestered carbon dioxide particles can include a protective coating.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments relating to proppants containing sequestered carbon dioxide and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to systems and methods for forming and using proppant containing sequestered carbon dioxide. The example embodiments described herein can provide applications for replacing conventional proppant materials with proppants comprising sequestered carbon dioxide. Using proppants that include sequestered carbon dioxide can reduce the overall volume of carbon dioxide emitted in connection with hydrocarbon wells and can remove existing carbon dioxide from the atmosphere.

Traditionally, hydraulic fracturing has employed proppants such as silica sand and other particles meeting specific hardness criteria. However, the present disclosure proposes that alternate proppants having a lower hardness can be combined with traditional proppants to provide an effective proppant composition for use in hydraulic fracturing. Such alternate proppants also provide an opportunity to capture carbon dioxide within the proppants.

Using proppants that contain sequestered carbon dioxide provides several advantages. First, millions of tons of proppant are used each year in the hydrocarbon industry in hydraulic fracturing operations. Replacing a portion of the raw material, such as silica sand, using a proppant containing sequestered carbon dioxide reduces the amount of raw material that otherwise must be mined and transported for use as proppant. Thus, reducing the costs and carbon dioxide emissions associated with mining and transporting the large volumes of silica sand provides significant benefits. These benefits can be further maximized when the sequestered carbon dioxide proppant can be formed at or near the wells where it is to be used. Second, when a portion of the proppant sequesters carbon dioxide from the atmosphere or from a combustion process, the proppant composition locks up carbon dioxide that would otherwise add to the total carbon dioxide in the atmosphere. Therefore, given the foregoing benefits, using a proppant composition containing sequestered carbon dioxide in a hydraulic fracturing operation reduces the carbon dioxide emissions that would normally be associated with the hydrocarbon well. As will be described further in the following examples, the methods and apparatus described herein improve upon prior art approaches to producing proppant for use in hydrocarbon wells.

As used herein, the terms "sequestered carbon dioxide" and "captured carbon dioxide" refer to the process of gathering carbon dioxide from the atmosphere or directly from a combustion process, combining the carbon dioxide with an aqueous solution, and producing calcium carbonate that traps the carbon dioxide in a solid compound.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 5:
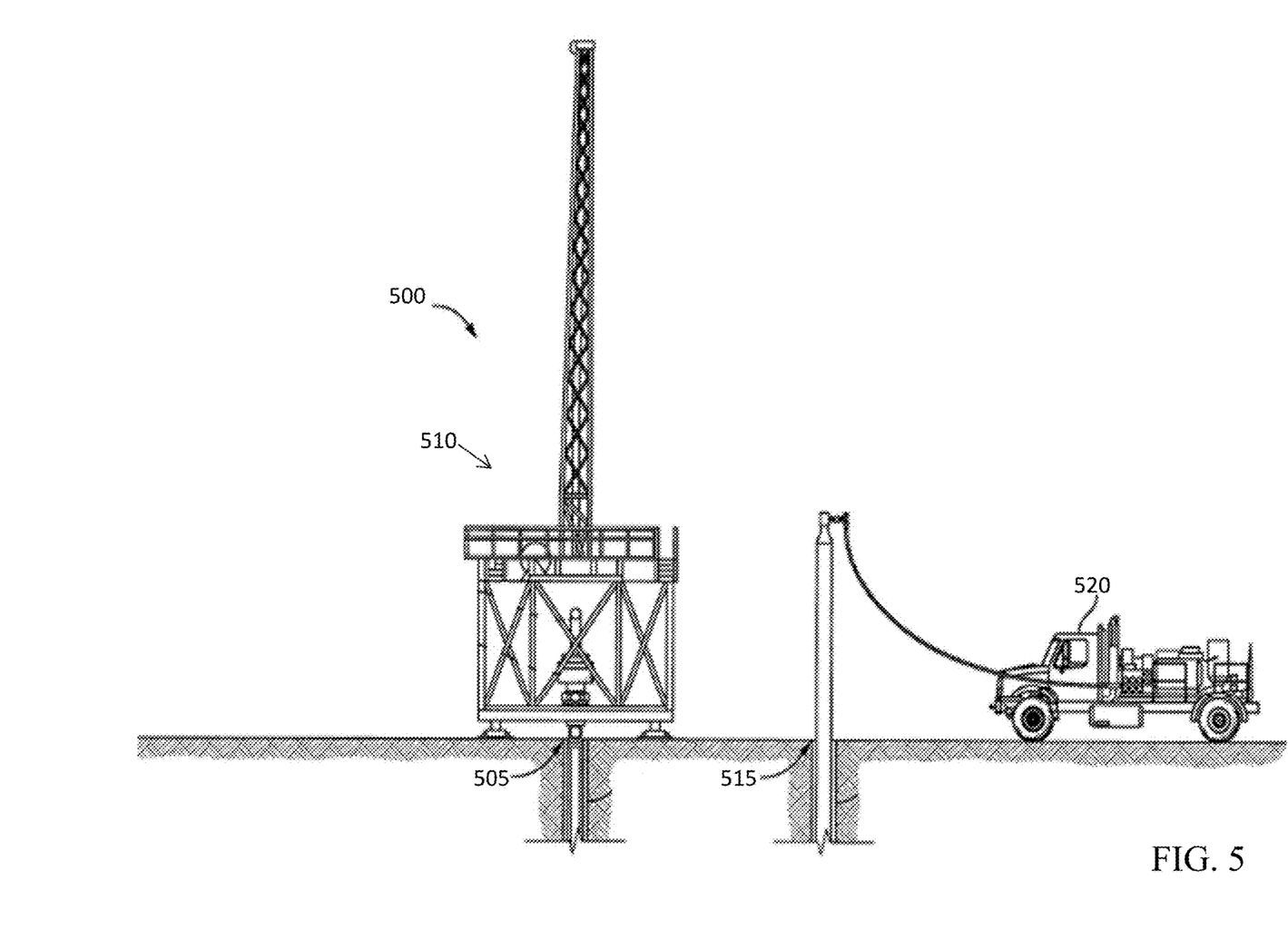
FIG. 5 illustrates a well pad comprising two hydrocarbon wells in accordance with an example embodiment of the disclosure.
Figure 6:
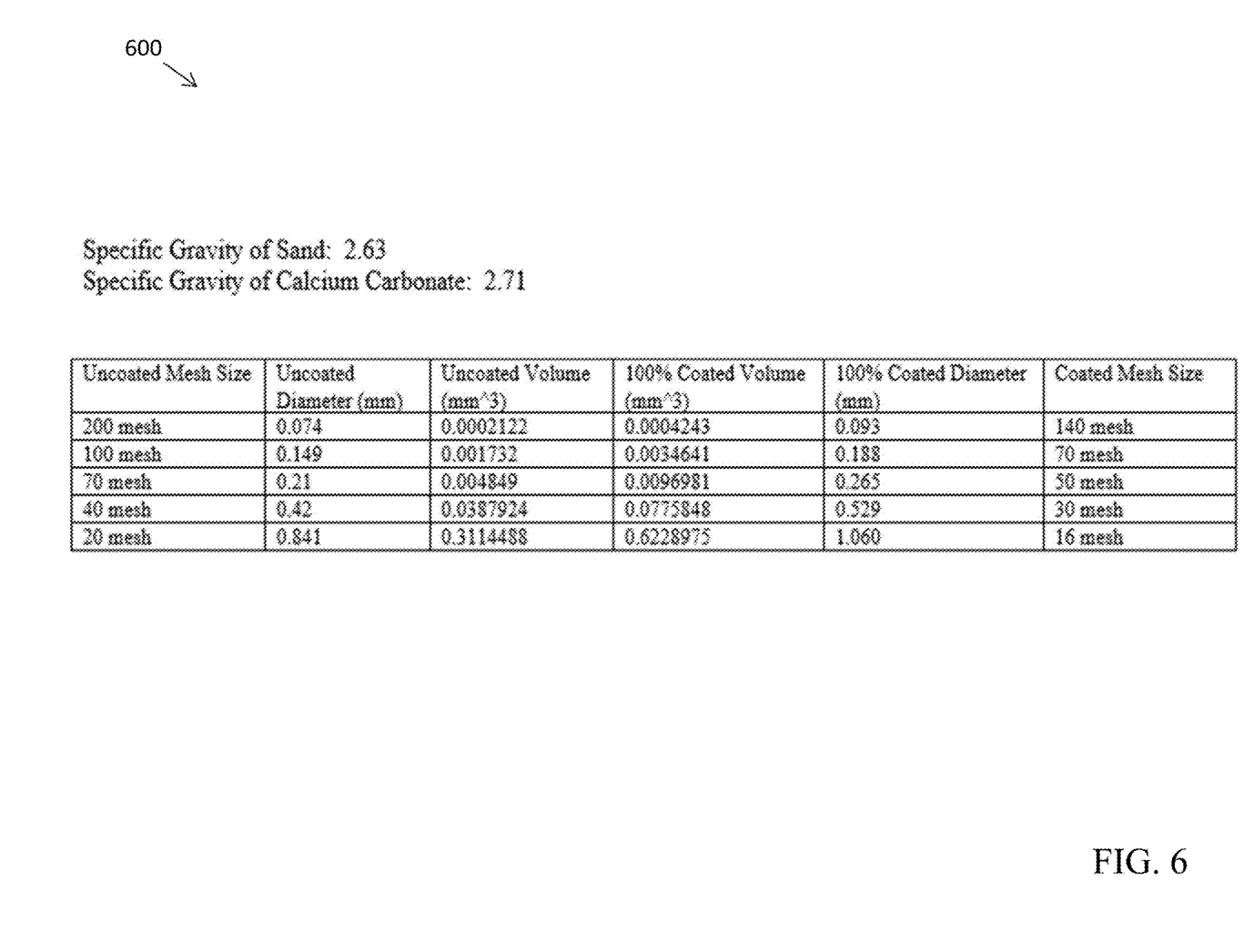
FIG. 6 shows representative data for substrate particles coated with calcium carbonate.

FIGS. 1A, 2A, 3A, and 4A illustrate varying processes for manufacturing a proppant that includes sequestered carbon dioxide. FIGS. 1B, 2B, 3B, and 4B illustrate the structure of a proppant particle produced according to each associated manufacturing process. FIG. 5 illustrates a hydrocarbon well undergoing a well stimulation operation whereby a hydraulic fracturing slurry containing a proppant is injected into the well. FIG. 6 provides example data for the sizes of a substrate particle and the substrate particle coated with calcium carbonate for use as a proppant.

Figures 1A, 1B:
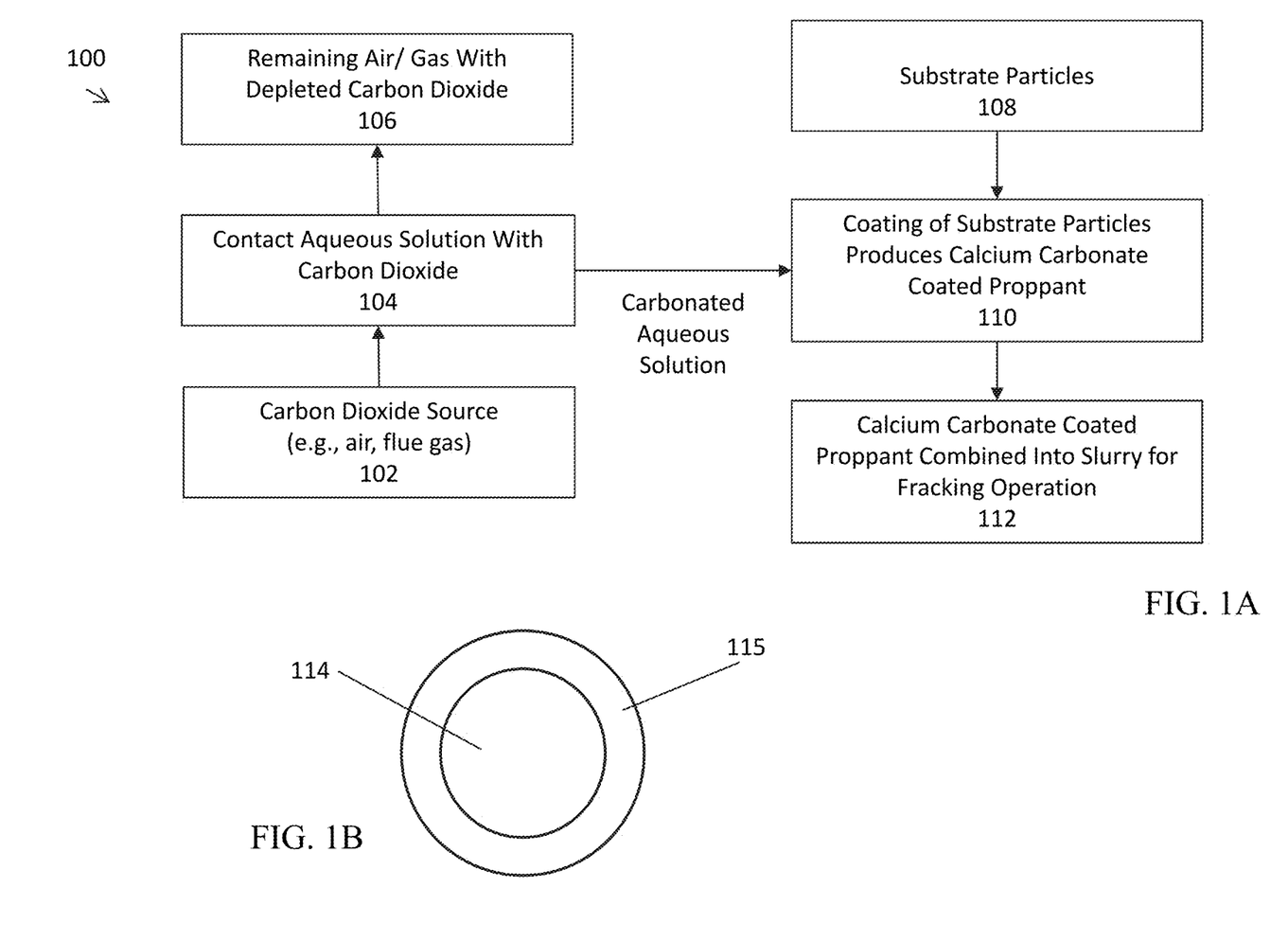
FIG. 1A illustrates a method of producing a proppant containing sequestered carbon dioxide in accordance with an example embodiment of the disclosure.
FIG. 1B illustrates a proppant particle produced using the method of FIG. 1A in accordance with an example embodiment of the disclosure.

Referring to FIG. 1A, an example method 100 is illustrated for manufacturing a proppant used in a hydraulic fracturing slurry in accordance with the example embodiments of this disclosure. In step 102, a source of carbon dioxide is gathered for use in the method 100. The source of carbon dioxide can be air from the atmosphere or flue gas from the burning of a hydrocarbon.

In step 104, the carbon dioxide source is contacted with an aqueous solution containing calcium ions. While the carbon dioxide source in step 102 is typically in gas form such as air or flue gas, it should be understood that the state of the carbon dioxide can be modified for the purpose of contacting with the aqueous solution. For example, the carbon dioxide brought into contact with the aqueous solution can be in the state of a gas, a liquid, a solid, or a mixture of one of these states. The carbon dioxide source can be brought into contact with the aqueous solution by bubbling carbon dioxide gas through the aqueous solution or by mixing solid or liquid forms of the carbon dioxide with the fluid flow of the aqueous solution. The carbon dioxide reacts with the aqueous solution and produces carbonic acid, bicarbonate ions, and carbonate ions. The presence of calcium ions in the aqueous solution allows for a greater concentration of the carbon dioxide to be sequestered. It should be understood that in alternate embodiments, other divalent cations such as magnesium ions, can be included in the aqueous solution. After the carbon dioxide is contacted with the aqueous solution, the remaining carbon dioxide source gas, which has now been depleted of the carbon dioxide absorbed in step 104, is discharged in step 106 having less carbon dioxide than when it was the original source gas in step 102. Thus, step 104 removes carbon dioxide from the carbon dioxide source and discharges a depleted carbon dioxide gas in step 106.

In step 108, substrate particles are gathered for use in sequestering the carbon dioxide absorbed into the aqueous solution. The substrate particles can be any of a variety of particles that can be used as proppant including, but not limited to one or more of silica sand, drilling cuttings from well drilling, recycled cement, and fly ash. As another example, the substrate particles can be calcium carbonate particles, including mined or synthetically manufactured calcium carbonate particles, which are subsequently coated, in step 110, with a calcium carbonate coating containing sequestered carbon dioxide. In order for the resulting proppant to have a size appropriate for use as a proppant in hydraulic fracturing, the substrate particles typically have a size in the range from 20 mesh to 200 mesh.

Referring to step 110, the substrate particles are submerged in the aqueous solution containing carbonates from step 104. While the substrate particles are submerged in the aqueous solution, calcium carbonate compositions precipitate and form a coating of calcium carbonate on the exterior of the substrate particles. The precipitation of the calcium carbonate compositions can be controlled in various ways, including, for example, controlling the temperature of the aqueous solution so that it is in the range of 5 to 70 degrees C. In other examples, other properties of the aqueous solution that can be controlled in order to control precipitation include adjusting the pH of the aqueous solution so that it is in the range of 9 to 14. The result of step 110 is a collection of proppant particles that are coated with calcium carbonate.

FIG. 1B provides a cross-sectional illustration of a proppant particle produced in step 110. FIG. 1B shows the inner substrate particle 114 and the outer calcium carbonate coating 115. The calcium carbonate forms a hard shell on the substrate particles and traps the carbon dioxide that was absorbed into the aqueous solution as described in connection with step 104. The calcium carbonate shell formed on the substrate particles increases the diameter of the particles resulting in proppant particles with a size in the range of 16 mesh to 140 mesh that is appropriate for use in hydraulic fracturing.

In step 112 of FIG. 1A, the proppant particles produced in step 110 are combined with a hydraulic fracturing fluid as those fluids are generally know to those of skill in this field. The result of the combination is a slurry that can be used in hydraulic fracturing. Using the calcium carbonate coated proppant as a substitute for conventional proppant, such as silica sand, reduces energy use that would be needed to extract and transport the silica sand. Additionally, the sequestered carbon dioxide in the calcium carbonate shell of proppant particles can offset all or a portion of the carbon dioxide generated from other sources.

Although the calcium carbonate coated proppant may have a lower hardness that traditional proppant, such as silica sand, combining the two types of proppant can result in an effective proppant composition. A portion of the conventional proppant that would be used in a hydraulic fracturing operation can be replaced with calcium carbonate coated proppant. As one example, a proppant composition can comprise 50% or more by weight of conventional proppant, such as silica sand, and up to 50% by weight of the proppant containing sequestered carbon dioxide. In other examples, the ratio of conventional proppant to sequestered carbon dioxide proppant can be 60% to 40%, or 70% to 30%, or 80% to 20%, or 90% to 10%.

It should be understood that the example method 100 of FIG. 1A can be modified within the scope of this disclosure. For example, certain steps of method 100 may be altered. Moreover, additional steps may be added in sequence or in parallel to the method 100.

Figures 2A, 2B:
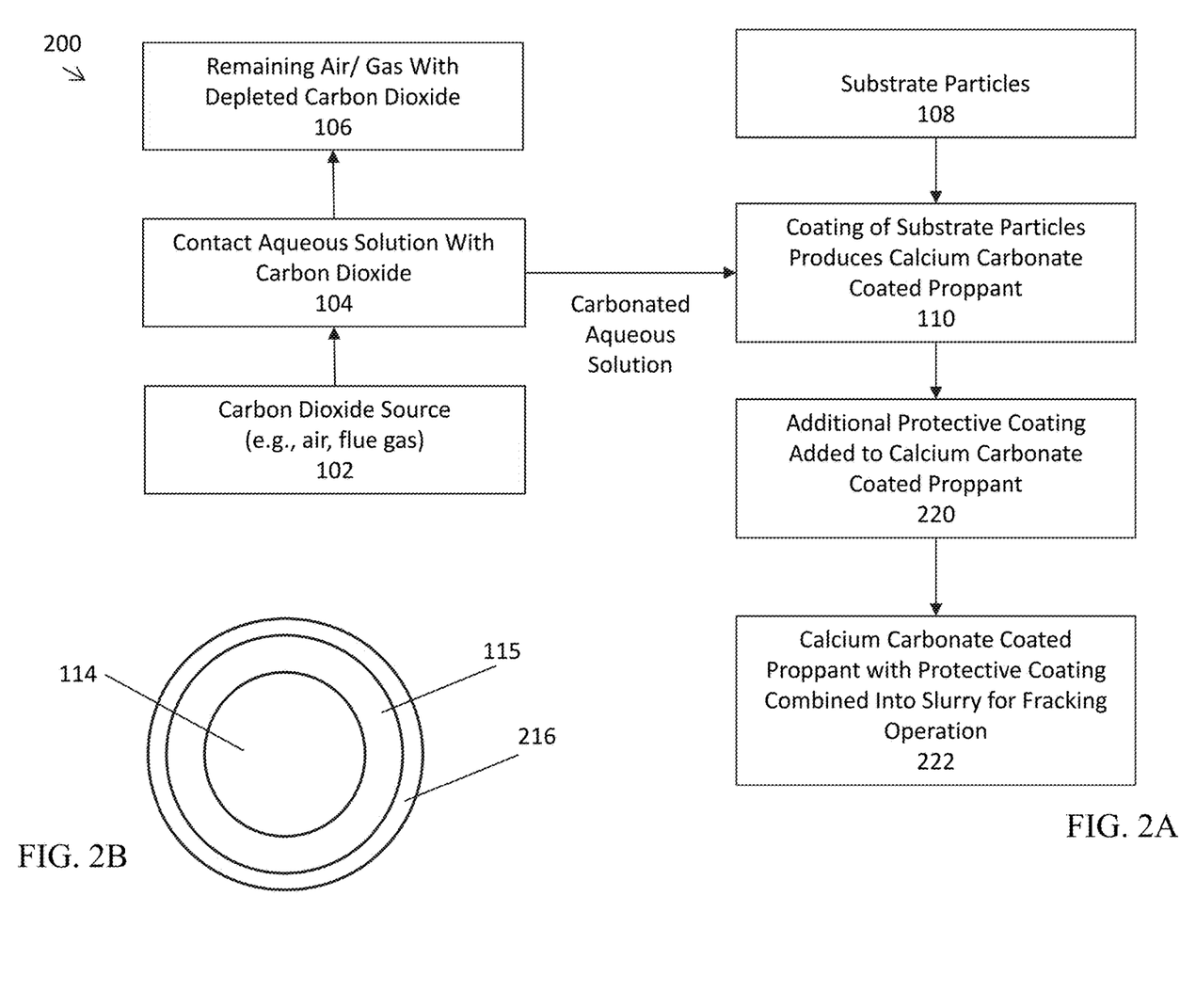
FIG. 2A illustrates a method of producing a proppant containing sequestered carbon dioxide in accordance with an example embodiment of the disclosure.
FIG. 2B illustrates a proppant particle produced using the method of FIG. 2A in accordance with an example embodiment of the disclosure.

Referring now to FIG. 2A, a variation on the method of FIG. 1A is illustrated. Specifically, FIG. 2A illustrates example method 200. Example method 200 begins in the same manner as method 100 of FIG. 1A. Accordingly, it should be understood that steps 102 through 110 of FIG. 2A are substantially identical to steps 102 through 110 of FIG. 1A and the description of those steps will not be repeated. Example method 200 differs from example method 100 in that in step 220 a protective coating is applied to the calcium carbonate coated proppant. Examples of protective coatings that can be applied to the calcium carbonate coated proppant include polymers. Because the calcium carbonate coated proppant produced in step 110 may lack the hardness of conventional proppants, the additional protective coating can provide additional hardness or strength to the proppant and can be beneficial in certain circumstances. In addition to or as an alternative to increasing strength, the additional protective coating applied onto the calcium carbonate coating can also be useful to inhibit the calcium carbonate coating from reacting with surrounding materials when in the slurry or when injected into the well.

FIG. 2B provides a cross-sectional illustration of the components of the proppant produced in step 220. As shown in FIG. 2B, the substrate particle 114 is coated with calcium carbonate 115 containing sequestered carbon dioxide. Onto the calcium carbonate coating 115 is placed a protective coating 216 that may provide additional strength or hardness to the proppant. Alternatively, or in addition, the protective coating 216 may protect the calcium carbonate coating from reacting with other materials in the slurry or in the formation.

In step 222, the calcium carbonate coated proppant with the additional protective coating is combined with a hydraulic fracturing fluid to produce a hydraulic fracturing slurry. Similar to the description for FIG. 1A, in certain example embodiments, the proppant produced using method 200 can substitute a portion, such as up to 50%, of the conventional proppant that is used in a hydraulic fracturing operation.

It should be understood that the example method 200 of FIG. 2A can be modified within the scope of this disclosure. For example, certain steps of method 200 may be altered. Moreover, additional steps may be added in sequence or in parallel to the method 200.

Figures 3A, 3B:
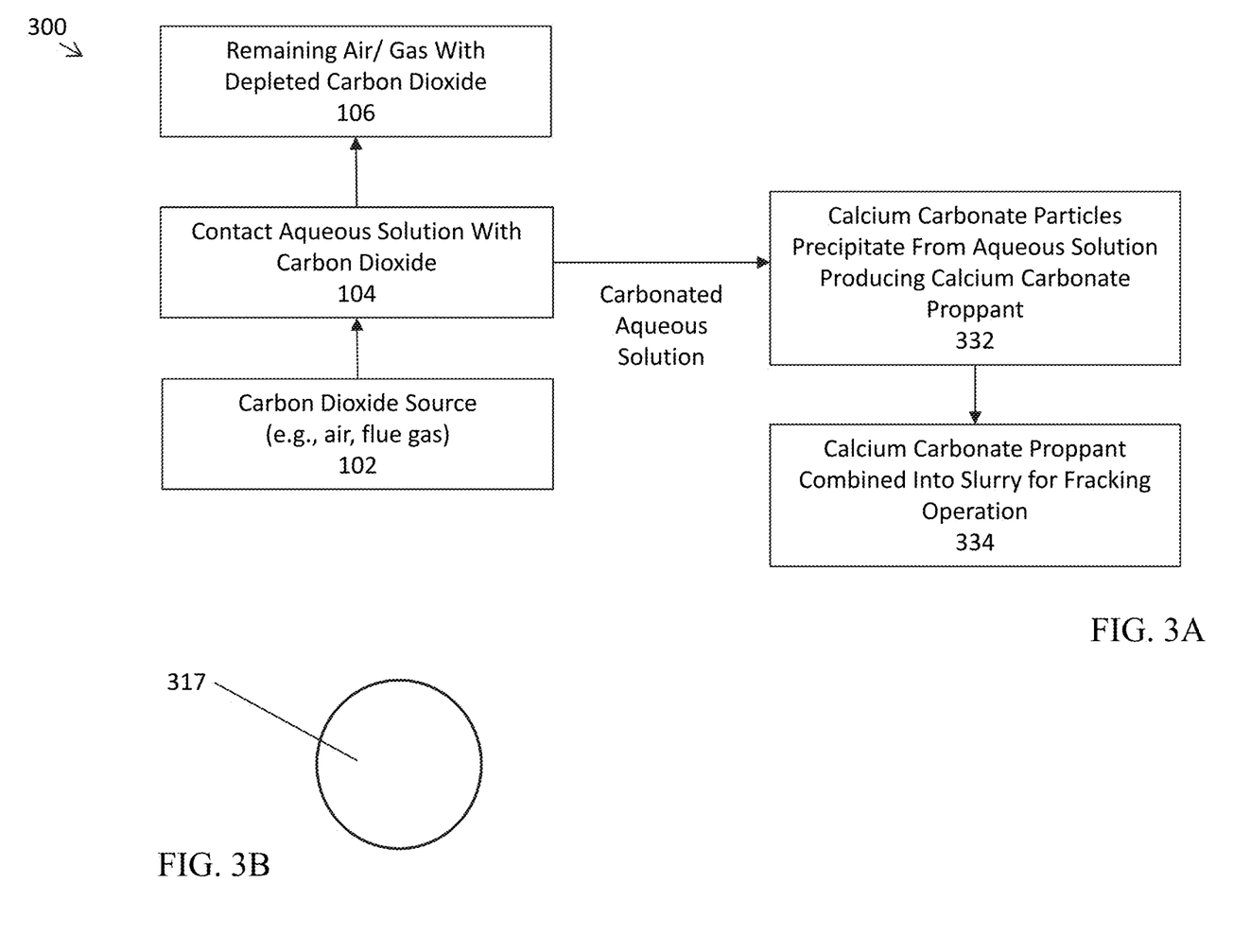
FIG. 3A illustrates a method of producing a proppant containing sequestered carbon dioxide in accordance with an example embodiment of the disclosure.
FIG. 3B illustrates a proppant particle produced using the method of FIG. 3A in accordance with an example embodiment of the disclosure.

Referring now to FIG. 3A, a variation on the method of FIG. 1A is illustrated. Specifically, FIG. 3A illustrates example method 300. Example method 300 begins in the same manner as method 100 of FIG. 1A. Accordingly, it should be understood that steps 102 through 106 of FIG. 3A are substantially identical to steps 102 through 106 of FIG. 1A and the description of those steps will not be repeated. Example method 300 differs from example method 100 in that substrate particles are not used for forming the proppant. Instead, in step 332 calcium carbonate particles precipitate from the aqueous solution and directly form the proppant particles. In other words, the proppant particles that are produced consist of the calcium carbonate that precipitates from the aqueous solution.

FIG. 3B provides a cross-sectional illustration of the proppant produced in step 332. As illustrated in FIG. 3B, the proppant is formed from the calcium carbonate 317 that precipitates from the aqueous solution.

Referring to step 334, the calcium carbonate proppant formed in step 332 is combined with a hydraulic fracturing fluid, such as those fluids generally known to those of skill in this field. The combination in step 334 produces a hydraulic fracturing slurry that can be injected into a well in a stimulation operation.

It should be understood that the example method 300 of FIG. 3A can be modified within the scope of this disclosure. For example, certain steps of method 300 may be altered. Moreover, additional steps may be added in sequence or in parallel to the method 300.

Figures 4A, 4B:
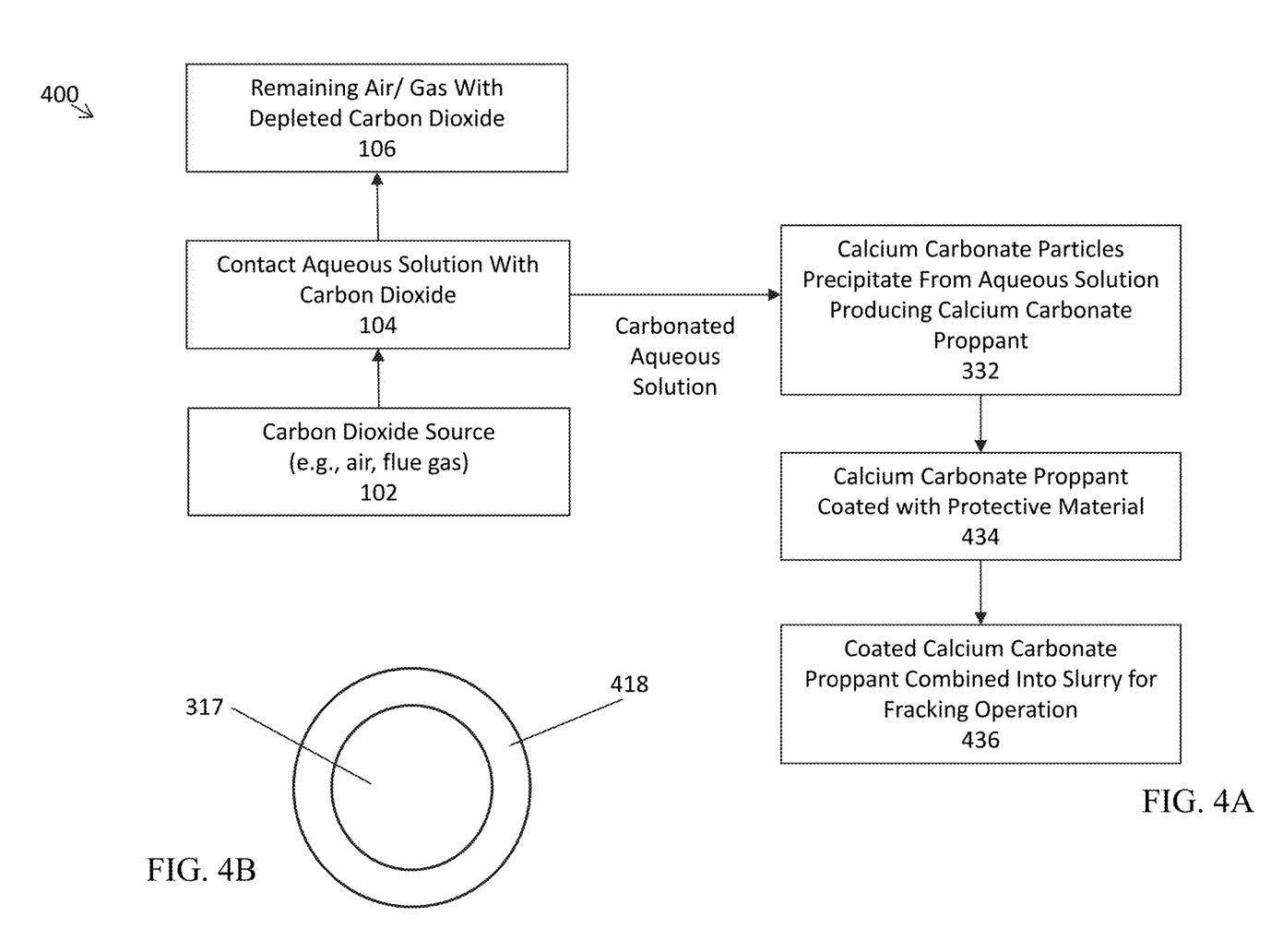
FIG. 4A illustrates a method of producing a proppant containing sequestered carbon dioxide in accordance with an example embodiment of the disclosure.
FIG. 4B illustrates a proppant particle produced using the method of FIG. 4A in accordance with an example embodiment of the disclosure.

Referring now to FIG. 4A, a variation on the method of FIG. 3A is illustrated. Specifically, FIG. 4A illustrates example method 400. Example method 400 begins in the same manner as method 300 of FIG. 3A. Accordingly, it should be understood that steps 102 through 106 and step 332 of FIG. 4A are substantially identical to steps 102 through 106 and step 332 of FIG. 3A and the description of those steps will not be repeated. Example method 400 differs from example method 300 in that in step 434 a protective coating is applied to the calcium carbonate coated proppant. Examples of protective coatings that can be applied to the calcium carbonate coated proppant include polymers. Because the calcium carbonate proppant produced in step 332 may lack the hardness of conventional proppants, the additional protective coating can provide additional hardness or strength to the proppant and can be beneficial in certain circumstances. In addition to or as an alternative to increasing strength, the additional protective coating applied onto the calcium carbonate coating can also be useful to inhibit the calcium carbonate coating from reacting with surrounding materials when in the slurry or when injected into the well.

FIG. 4B provides a cross-sectional illustration of the components of the proppant produced in step 434. As shown in FIG. 4B, the calcium carbonate particle 317 is coated with a protective coating 418 that may provide additional strength or hardness to the proppant. Alternatively, or in addition, the protective coating 418 may protect the calcium carbonate coating from reacting with other materials in the slurry or in the formation.

In step 436, the calcium carbonate proppant with the additional protective coating is combined with a hydraulic fracturing fluid to produce a hydraulic fracturing slurry. Similar to the description for FIG. 1A, in certain example embodiments, the proppant produced using method 400 can substitute a portion, such as up to 50%, of the conventional proppant that is used in a hydraulic fracturing operation.

It should be understood that the example method 400 of FIG. 4A can be modified within the scope of this disclosure. For example, certain steps of method 400 may be altered. Moreover, additional steps may be added in sequence or in parallel to the method 400.

Referring now to FIG. 5, an example of a hydrocarbon well pad 500 is illustrated. In FIG. 5, the well pad 500 includes a first well 505 and a second well 515. A rig 510 is disposed over the first well 505. A pumping truck 520 is disposed adjacent to the second well 515 and the pumping truck 520 is injecting hydraulic fracturing slurry into the second well 515. The hydraulic fracturing slurry pumped into the second well 515 can be any of the hydraulic fracturing slurrys produced in accordance with the previously described methods of FIGS. 1A, 1B, 1C, and 1D. In other words, at least a portion of the proppant included in the hydraulic fracturing slurry comprises carbon dioxide sequestered particles.

Referring now to FIG. 6, a table 600 of example data is provided. Specifically, table 600 provides example data for uncoated substrate particles and substrate particles that have been coated with calcium carbonate and that are to be used as a proppant. Starting from the left hand side of table 600, the first two columns provide mesh sizes and diameters for silica sand particles that can serve as the substrate particles described in the foregoing methods. It is assumed the silica sand particles approximate the shape of a sphere, so the third column from the left provides the calculated volumes for silica sand particles over a range of sizes. The fourth column from the left provides the calculated volume for the coated proppant particle. In other words, this column indicates that the volume of the proppant particle doubles when the silica sand particle is coated with calcium carbonate. The fifth and sixth columns provide the diameter and mesh size for the coated proppant particle. The mesh sizes for the particle range from 16 mesh to 140 mesh, which encompasses the range of sizes for typical proppant particles used in hydraulic fracturing slurry.

Figure 7A:
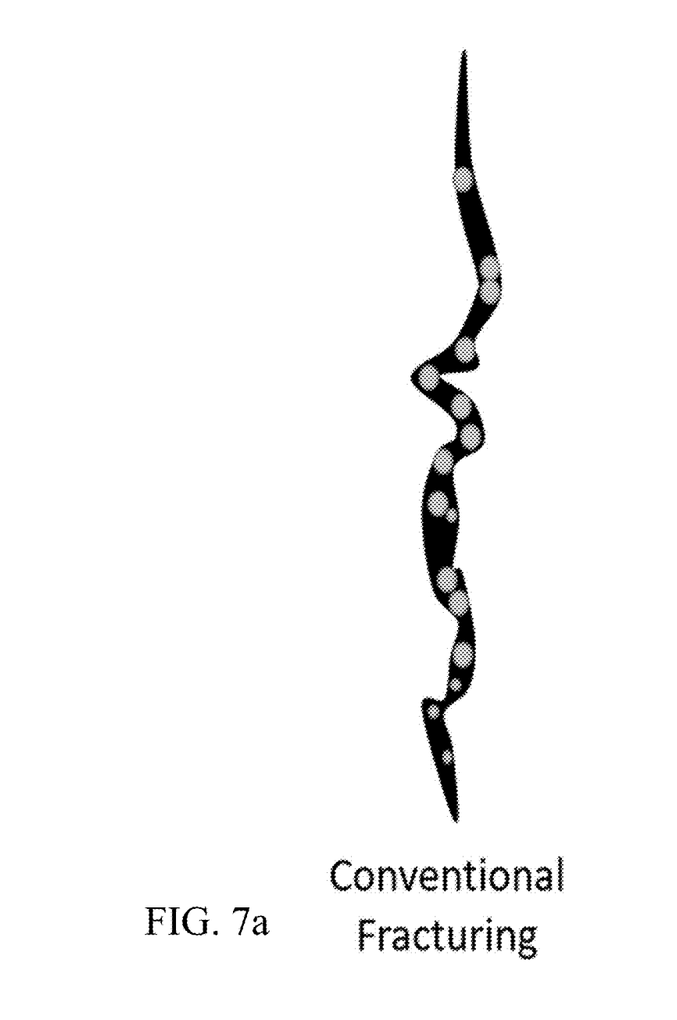
FIG. 7a illustrates proppant particles in a fracture in accordance with conventional fracturing.
Figure 7B:
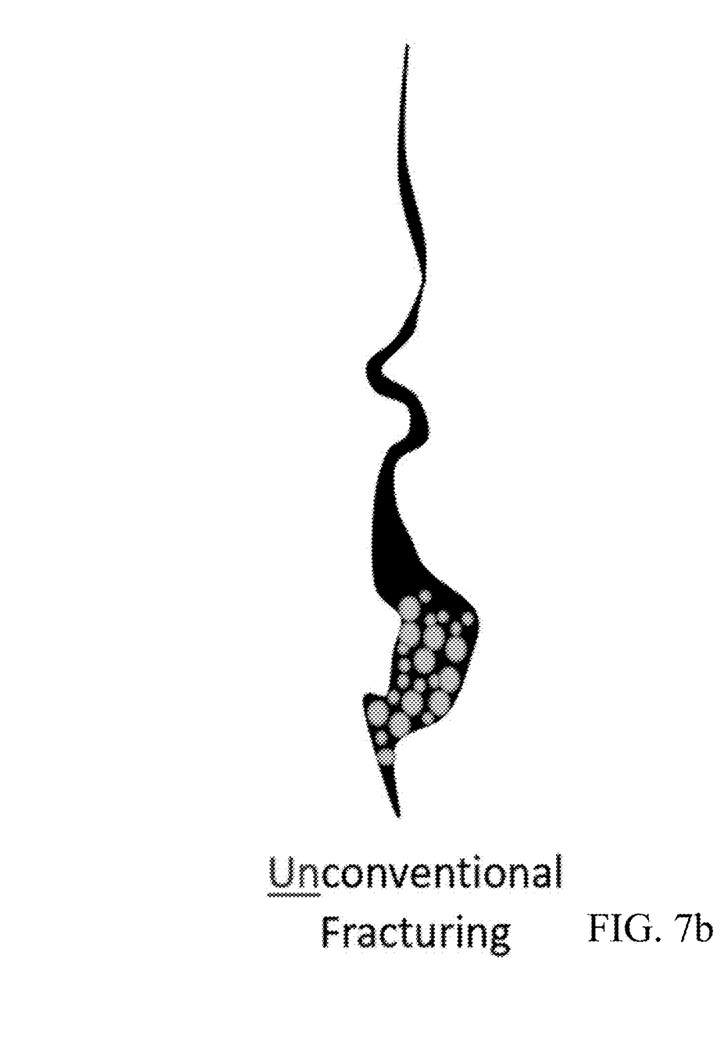
FIG. 7b illustrates proppant particles concentrated at one end of a fracture in accordance with unconventional fracturing in accordance with the example embodiments of the present disclosure.

Referring now to FIGS. 7a and 7b, illustrations of fractures containing proppant particles are provided. FIG. 7a illustrates a conventional fracture in a formation with proppant particles distributed along the length of the fracture. The illustration provided in FIG. 7a is consistent with conventional fracturing techniques such as those described in API specification 19c. In contrast to conventional fracturing techniques, FIG. 7b illustrates an unconventional fracture in a formation with proppant particles concentrated at one end of the fracture. As described previously, the proppants produced by the examples illustrated in FIGS. 1-6 provide new opportunities for using different types of proppants, including proppants having varying strength and varying size distributions. Accordingly, the proppants of the example embodiments described herein can be used in an unconventional fracturing approach as illustrated in FIG. 7b.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one step or component from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of making a hydraulic fracturing slurry, the method comprising:
    contacting an aqueous solution comprising calcium ions with a carbon dioxide source producing a carbonated aqueous solution;
    submerging substrate particles in the carbonated aqueous solution to produce calcium carbonate coated particles comprising the substrate particles coated with a calcium carbonate coating, wherein the calcium carbonate coating comprises sequestered carbon dioxide from the carbon dioxide source, wherein the substrate particles have a hardness less than silica sand, and wherein calcium carbonate coated particles have a diameter in the range of 70 mesh to 140 mesh;
    blending the calcium carbonate coated particles proppant with silica sand particles to form a proppant composition, the proppant composition comprising 50% or more by weight of the silica sand particles and up to 50% by weight of the calcium coated particles; and
    blending the proppant composition with a hydraulic fracturing fluid to produce the hydraulic fracturing slurry.

2. The method of claim 1, further comprising, after contacting the aqueous solution with the carbon dioxide source, releasing a depleted carbon dioxide gas.

3. The method of claim 1, further comprising applying a protective coating over the calcium carbonate coated particles.

4. The method of claim 3, wherein the protective coating is a polymer.

5. The method of claim 3, wherein the calcium carbonate coated particles in combination with the protective coating have a mesh size range between 70 mesh and 140 mesh.

6. The method of claim 1, wherein the calcium carbonate coated particles consist of the substrate particles, the calcium carbonate coating, and a protective coating applied over the calcium carbonate coating.

7. The method of claim 1, wherein the calcium carbonate coated particles have a mesh size of 140 mesh.

8. The method of claim 1, wherein the substrate particles are drilling cuttings.

9. The method of claim 1, wherein the substrate particles are one of recycled cement and fly ash.

10. The method of claim 1, wherein the substrate particles have a mesh size range between 100 mesh and 200 mesh and the calcium carbonate coated particles have a mesh size range between 70 mesh and 140 mesh.

11. A hydraulic fracturing slurry comprising:
    hydraulic fracturing fluid; and
    a proppant composition comprising 50% or more by weight of silica sand particles and up to 50% by weight of calcium carbonate coated particles having a diameter in a range of 70 mesh to 140 mesh, the calcium carbonate coated particles comprising a substrate, the substrate having a hardness less than silica sand, and a coating of calcium carbonate comprising sequestered carbon dioxide.

12. The hydraulic fracturing slurry of claim 11, wherein the calcium carbonate coated particles are further coated with a protective coating.

13. The hydraulic fracturing slurry of claim 12, wherein the protective coating is a polymer.

14. The hydraulic fracturing slurry of claim 12, wherein the calcium carbonate coated particles in combination with the protective coating have a mesh size range between 70 mesh and 140 mesh.

15. The hydraulic fracturing slurry of claim 11, wherein the calcium carbonate coated particles consist of the substrate particles, the calcium carbonate coating, and a protective coating applied over the calcium carbonate coating.

16. The hydraulic fracturing slurry of claim 11, wherein the calcium carbonate coated particles have a mesh size of 140 mesh.

17. The hydraulic fracturing slurry of claim 11, wherein the substrate particles are drilling cuttings.

18. The hydraulic fracturing slurry of claim 11, wherein the substrate particles are one of recycled cement and fly ash.

19. The hydraulic fracturing slurry of claim 11, wherein the substrate particles have a mesh size range between 100 mesh and 200 mesh and the calcium carbonate coated particles have a mesh size range between 70 mesh and 140 mesh.

* * * * *